US012693951B2

(12) United States Patent
Sayyed et al.

(10) Patent No.: US 12,693,951 B2
(45) Date of Patent: Jul. 28, 2026

(54) DIAGNOSTIC BOOT CYCLES IN A HETEROGENEOUS COMPUTING PLATFORM

(71) Applicant: Dell Products L.P., Round Rock, TX (US)

(72) Inventors: Ibrahim Sayyed, Georgetown, TX (US); Adolfo S. Montero, Pflugerville, TX (US); Abir Kumar, Bangalore (IN); Phanindra Talasila, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 18/626,382

(22) Filed: Apr. 4, 2024

(65) Prior Publication Data

US 2025/0315354 A1     Oct. 9, 2025

(51) Int. Cl.
*G06F 11/22* (2006.01)

(52) U.S. Cl.
CPC ...... *G06F 11/2284* (2013.01); *G06F 11/2268* (2013.01)

(58) Field of Classification Search
CPC .......................... G06F 11/2268; G06F 11/2284
See application file for complete search history.

(56) References Cited

U.S. PATENT DOCUMENTS 10,628,285 B1 *   4/2020   Kollu ....................... G06F 11/36
2002/0166061 A1 *  11/2002   Falik ........................ G06F 8/654
                                                        711/E12.099
2007/0168746 A1 *   7/2007   Righi ................... G06F 11/3656
                                                        714/38.11
2008/0168310 A1 *   7/2008   Saretto ................ G06F 11/1417
                                                        714/E11.02
2016/0261455 A1 *   9/2016   Su ........................... H04L 41/069
2020/0073676 A1 *   3/2020   Liu ........................ G06F 9/4411
2020/0089572 A1 *   3/2020   Bodner ............... G06F 11/2284
2020/0334045 A1 *  10/2020   Chaiken ............... G06F 21/575
2021/0286692 A1 *   9/2021   Chien .................. G06F 11/2284
2022/0156205 A1 *   5/2022   Banik ..................... G06F 8/654
2023/0245709 A1 *   8/2023   Samuel ............... G06F 11/2094
                                                        714/723
2025/0315353 A1 *  10/2025   Sayyed ............... G06F 11/2284

FOREIGN PATENT DOCUMENTS

GB            2328045 A  *  2/1999   ......... G06F 11/2284

* cited by examiner

*Primary Examiner* — Joseph O Schell
(74) *Attorney, Agent, or Firm* — Fogarty LLP

(57) ABSTRACT

Systems and methods include an Information Handling System (IHS) that is adapted to provide diagnostic boot cycles. Once an IHS is powered, a boot sequence is initiated. During or after booting of the IHS, a request is detected for a diagnostic boot cycle by a requestor, such as by the operating system of the IHS. When a diagnostic boot cycle has been requested, an EC (Embedded Controller) of the IHS is booted in a diagnostic mode to perform a diagnostic test on one or more hardware components of the IHS. The results of the diagnostic test are stored to the NVRAM (Non-Volatile Random-Access Memory) that stores the boot code and that is accessible to the requestor of the diagnostic test once the IHS has been rebooted to a non-diagnostic mode.

17 Claims, 4 Drawing Sheets

400

100

200

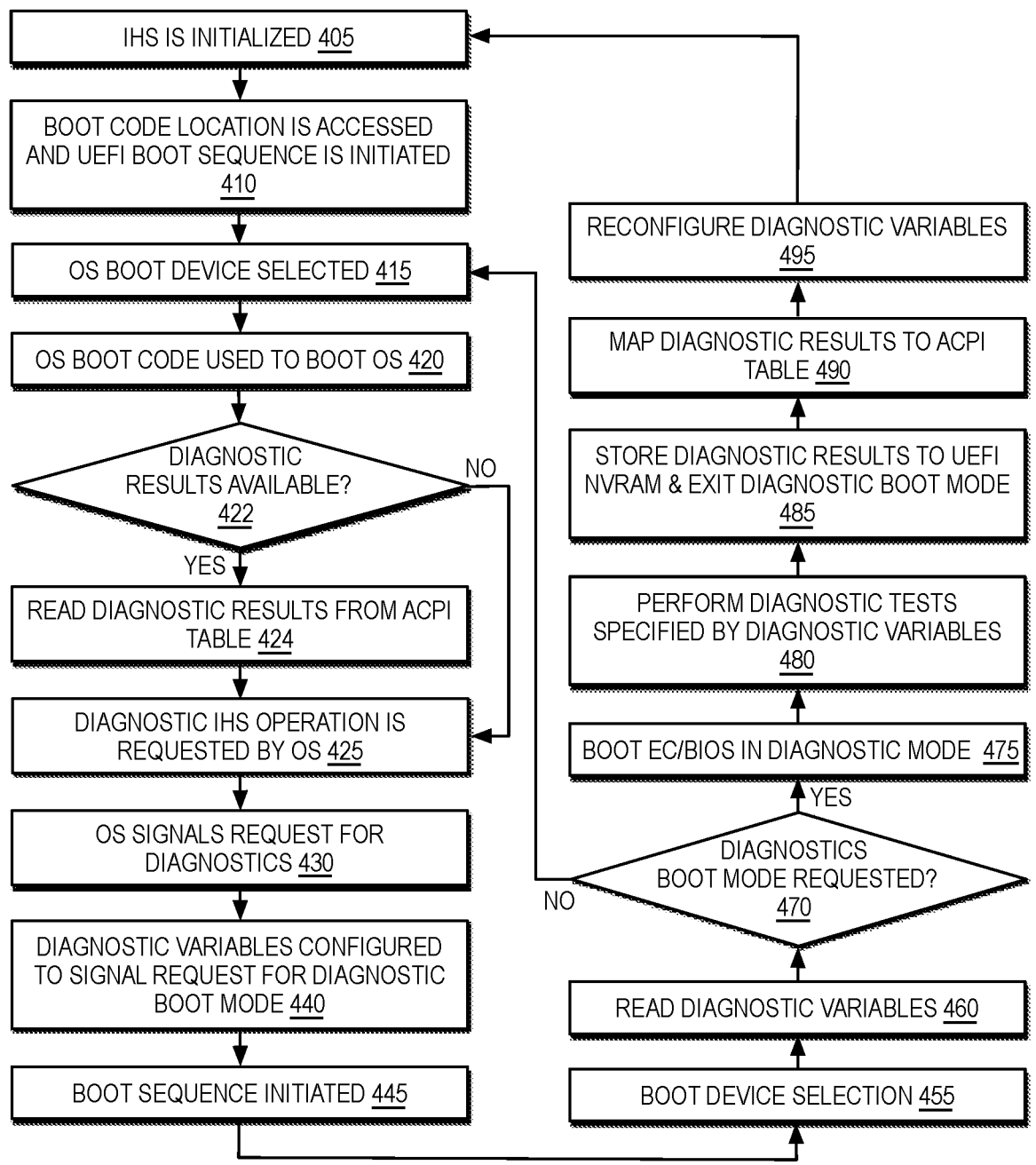

IHS IS INITIALIZED 405

BOOT CODE LOCATION IS ACCESSED AND UEFI BOOT SEQUENCE IS INITIATED 410

OS BOOT DEVICE SELECTED 415

OS BOOT CODE USED TO BOOT OS 420

DIAGNOSTIC RESULTS AVAILABLE? 422

NO

YES

READ DIAGNOSTIC RESULTS FROM ACPI TABLE 424

DIAGNOSTIC IHS OPERATION IS REQUESTED BY OS 425

OS SIGNALS REQUEST FOR DIAGNOSTICS 430

DIAGNOSTIC VARIABLES CONFIGURED TO SIGNAL REQUEST FOR DIAGNOSTIC BOOT MODE 440

BOOT SEQUENCE INITIATED 445

RECONFIGURE DIAGNOSTIC VARIABLES 495

MAP DIAGNOSTIC RESULTS TO ACPI TABLE 490

STORE DIAGNOSTIC RESULTS TO UEFI NVRAM & EXIT DIAGNOSTIC BOOT MODE 485

PERFORM DIAGNOSTIC TESTS SPECIFIED BY DIAGNOSTIC VARIABLES 480

BOOT EC/BIOS IN DIAGNOSTIC MODE 475

YES

DIAGNOSTICS BOOT MODE REQUESTED? 470

NO

READ DIAGNOSTIC VARIABLES 460

BOOT DEVICE SELECTION 455

DIAGNOSTIC BOOT CYCLES IN A HETEROGENEOUS COMPUTING PLATFORM

FIELD

This disclosure relates generally to Information Handling Systems (IHSs), and more specifically, to systems and methods for IHS diagnostics.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

In various embodiments, Information Handling Systems (IHSs) may include: an embedded controller; an NVRAM (Non-Volatile Random-Access Memory); and one or more processors coupled to the NVRAM, wherein the NVRAM comprises boot instructions that, upon execution by the processors, cause the IHS to: initiate a boot sequence; detect a request for a diagnostic boot cycle by a requestor; when a diagnostic boot cycle has been requested, boot the EC in a diagnostic mode to perform a diagnostic test on one or more hardware components of the IHS; store results of the diagnostic test to the NVRAM; and boot the IHS, wherein the requestor has access to the diagnostic test results stored in the NVRAM.

In some embodiments, the boot sequence comprises a UEFI boot sequence. In some embodiments, the diagnostic boot cycle is requested via one or more UEFI variables. In some embodiments, the diagnostic boot cycle request comprises a request for a first diagnostic test supported by the IHS. In some embodiments, the request for the first diagnostic test is specified in one or more additional UEFI variables. In some embodiments, the first diagnostic test comprises a diagnostic test of system memory of the IHS. In some embodiments, the diagnostic boot cycle request comprises a request for a first boot mode of the embedded controller. In some embodiments, the first boot mode of the embedded controller supports one or more diagnostic tests on a first hardware component of the IHS. In some embodiments, the requestor comprises an operating system application running on the IHS. In some embodiments, the operating system application comprises an operating system running on an SoC (System-on-Chip) of the IHS. In some embodiments, the boot instructions executed by the processors further cause the IHS to map the results of the diagnostic test stored in the NVRAM to ACPI (Advanced Configuration and Power Interface) entries. In some embodiments, the requestor accesses the diagnostic test results by queries to the ACPI entries.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a diagram illustrating an example of a method, according to some embodiments, for supporting diagnostic boot cycles.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
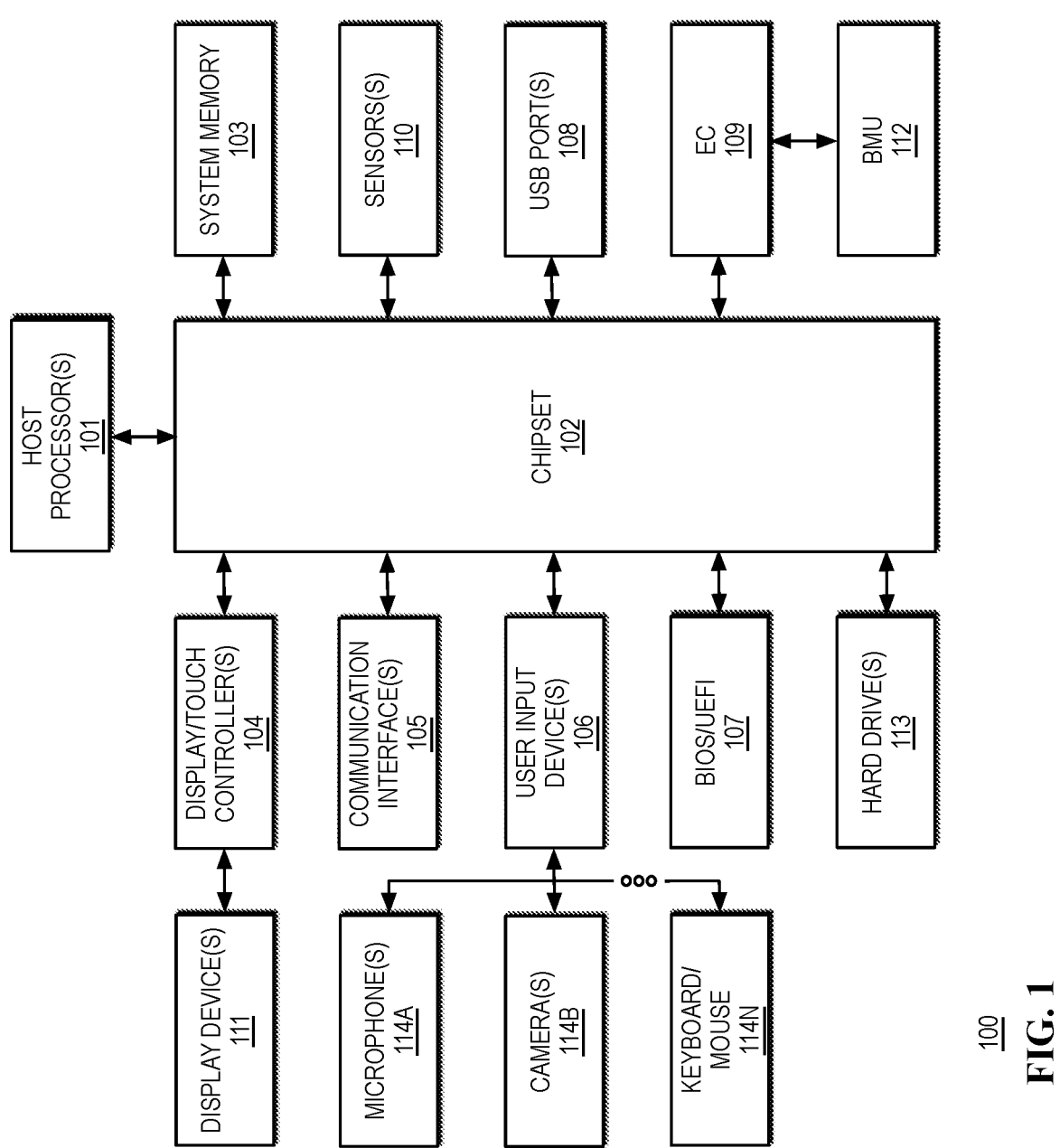
FIG. 1 is a diagram illustrating examples of components of an Information Handling System (IHS) that is configured, according to some embodiments, to support diagnostic boot cycles.

FIG. 1 is a block diagram of components of an IHS (Information Handling System) 100 that, in some embodiments, may include a heterogenous computing platform, as described in additional detail below, and that is configured to support diagnostic boot cycles, in particular to support diagnostic boot cycles that are triggered by an operating system (OS) of the IHS, but where the OS is not operational during the diagnostic operations. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI) was designed as a successor to BIOS, and many modern IHSs utilize UEFI in addition to or instead of a BIOS. Accordingly, as used herein, the term "BIOS" is intended to also encompass UEFI such that these terms may be used interchangeably. In operation, UEFI 107 provides an abstraction layer that allows the OS to interface with certain hardware components of the IHS 100. Upon booting of IHS 100, host processor(s) 101 may utilize program instructions of UEFI 107 to initialize and test hardware components that are coupled to IHS 100, and to load host OS 312 for use by IHS 100. Via the hardware abstraction layer provided by UEFI, software applications executed by host processor(s) 101 and/or SoCs 200 can interface with certain I/O devices that are coupled to IHS 100.

As described in additional detail below, booting of IHS 100 may be conducted according to boot sequence procedures, such as according to a UEFI 107 boot sequence. Operations by UEFI 107, and hardware devices that are accessed via UEFI, may be configured and operated through configuration of UEFI variables. These UEFI variables are stored in a secured NVRAM (Non-Volatile Random-Access Memory) or NVM (Non-Volatile Memory) of the IHS 100. In an IHS 100 that includes a heterogenous computing platform 200, various applications may access UEFI. In addition to access by a host OS 312 of the IHS 100, one or more service OSs 316 may be operated by the heterogenous computing platform 200 and may also access UEFI variables. In some embodiments, UEFI instructions may be used in implementing a diagnostic boot mode that operates separate from the OSs 312, 316 of the IHS.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc.

In some embodiments, EC 109 may implement a diagnostic boot mode that operates separate from the OSs 312, 316 of an IHS, thus providing improved diagnostic capabilities that are not affected by the OSs. The diagnostic boot mode of EC 109 be a selectable UEFI 107 boot mode and may allow diagnostic testing of hardware resources that are not fully testable when OSs 312, 316 are operational. As described in additional detail below, OSs 312, 316 may issue a request for a diagnostic boot cycle, where upon the subsequent rebooting of the IHS 100, the diagnostic boot mode of EC 109 is invoked and used to perform requested diagnostics on some or all of the hardware of IHS 100, with only EC 109 in operation and all other hardware of the IHS in testing, diagnostic or other passive modes.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "SOix" mode, where some or all of the internal hardware of IHS 100 may be placed into their lowest power state, while still supporting code execution that allows fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

Figure 2:
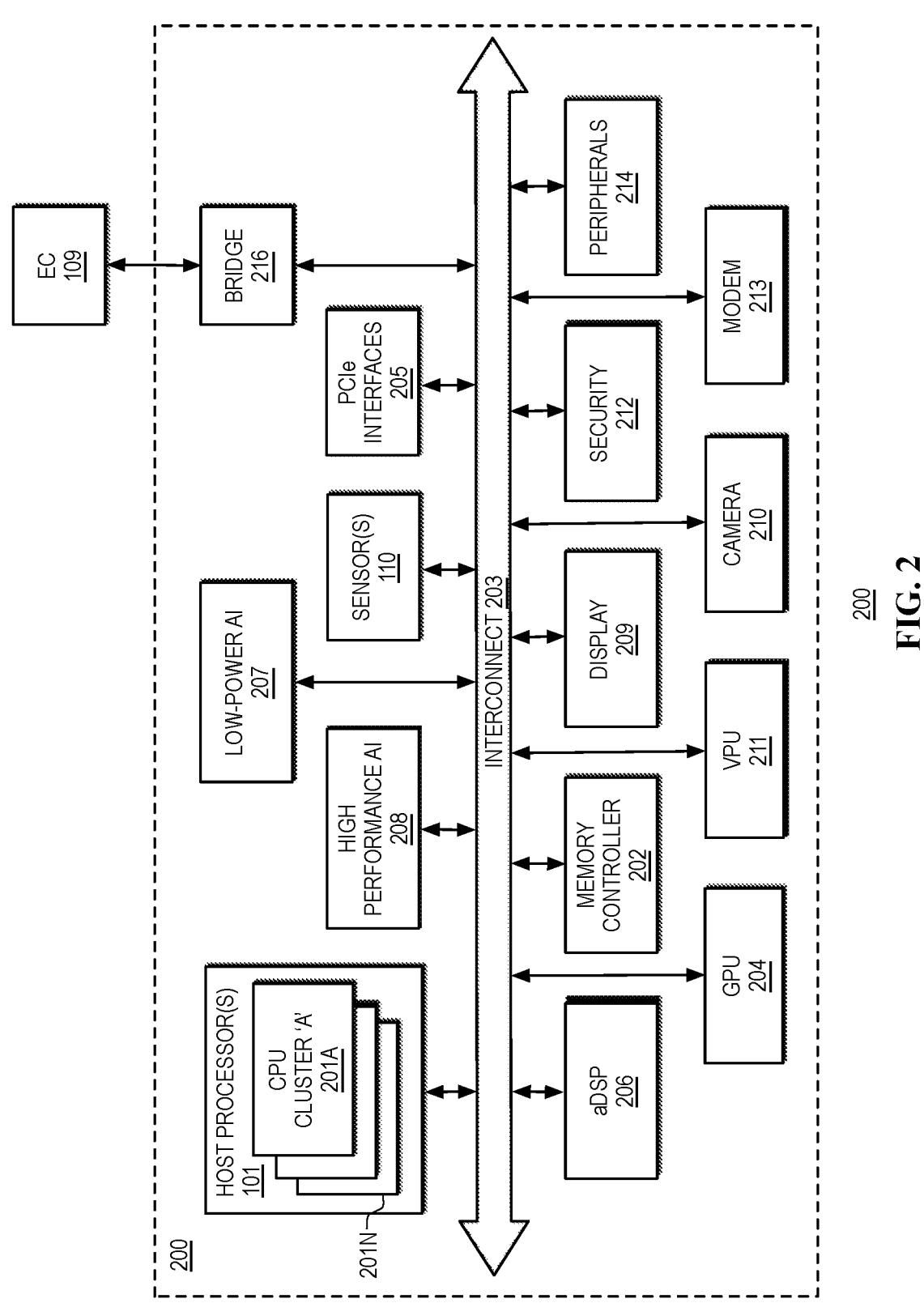
FIG. 2 is a diagram illustrating an example of a heterogenous computing platform configured, according to some embodiments, to support diagnostic boot cycles.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterogenous computing platform 200 configured to support diagnostic boot cycles, in particular where the heterogenous computing platform operates a service OS 316 or other application that may request a diagnostic boot cycle. In various embodiments, heterogenous computing platform 200 may be implemented in one or more SoCs, FPGAs, ASICs, or the like. Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices and may thus operate virtual machines.

As described in additional detail below, operating systems that run on the heterogenous computing platform 200 may include one more service OSs 316. In some embodiments, service OSs 316 operating on heterogenous computing platform 200 may have access to IHS hardware and may thus have use of diagnostic operations that are supported by the IHS, such as to isolate detected errors by confirming IHS system memory 103 is free from defects, or to confirm a hard drive 113 is operating without defects. As for a host OS 312, when a service OSs 316 is operational, a significant portion of the available hardware resources of an IHS are utilized. In comparison to a host OS 312, a service OS 316 may have limited ability to free resources on an IHS, such as to terminate resource intensive applications being run by the host OS 312. As such, a service OS 316 may be especially limited with regard to performing diagnostic procedures that are not impeded by the significant resource footprint of operating systems running on the IHS. Accordingly, embodiments provide capabilities for diagnostics via a diagnostic boot cycle that operates separate from any of the OSs 312, 316 that may operate on an IHS.

In some embodiments, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 312 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100, where configuration of such hardware may be via modifications to UEFI variables corresponding to a respective hardware component.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
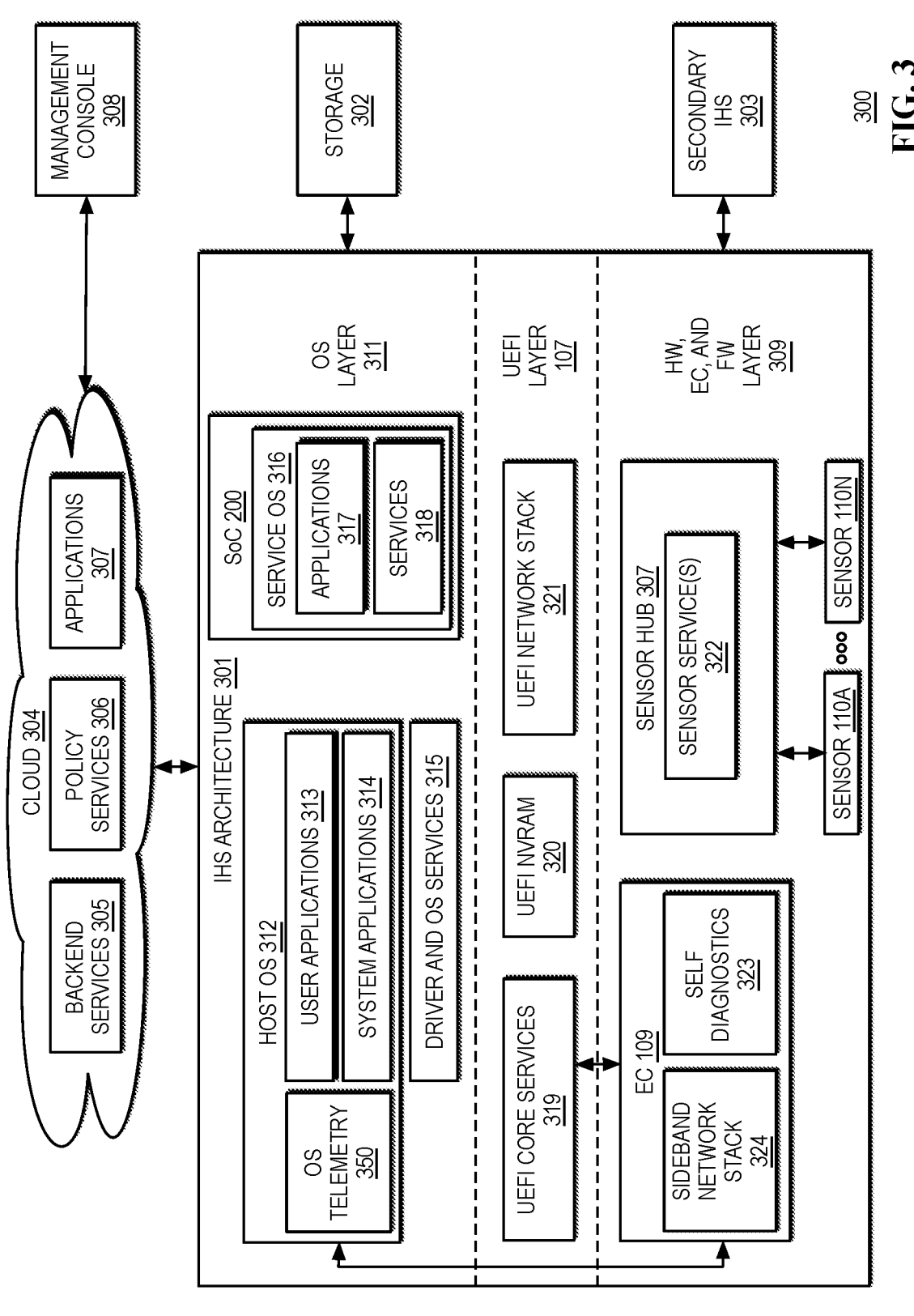
FIG. 3 is a diagram illustrating an example of a system, according to some embodiments, for supporting diagnostic boot cycles.

FIG. 3 is a diagram illustrating an example of architecture 300 for supporting diagnostic boot cycles. Embodiments provide such diagnostic boot cycle operations in scenarios where applications operated by the heterogenous computing platform 200, such as a service OS 316, includes capabilities for requesting diagnostic operations supported by the IHS. As illustrated, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 301 and/or secondary IHS 303, and configurable via ITDM management console 308. IHS architecture 301 may include hardware/EC/firmware layer 309, UEFI layer 107, and OS layer 311.

OS layer 311 includes a host OS (Operating System) 312 that is executed by host processor(s) 101. A variety of software applications may operate within the OS 312, where these applications may include user applications 313 and system applications 314, one or more OS telemetry applications 350. OS layer 311 may also include various drivers and other core OS operations, such as the operation of a kernel. In some embodiments, booting of the host OS 312 is selected based on selection of a boot device that includes the host OS boot code during the boot sequence of the IHS 100. In many instances, this boot device that includes instructions for booting the host OS 312 is the default boot device of the IHS 100.

As described, various components of a heterogenous computing platform may independently run their own operating systems, such as a service OS 316 that is run by an SoC 200 that is used to implement the heterogenous computing platform. Within IHS architecture 301, some of these discrete operating systems operated by the heterogenous computing platform 200 may be considered service OSs 316, where each service OS may each include its own applications 317 and services 318. In some embodiments, host OS 312 and/or service OS 316 may request the running of hardware diagnostic operations supported by IHS 100, such as IHS system memory 103 and storage drive 113, 302 diagnostics. However, the ability of these IHS diagnostic operations to fully test the hardware resources of the IHS is significantly impeded by the considerable hardware resources used in the operation of host OS 312 and/or service OS 316, even when the OSs are idle. Accordingly, embodiments support diagnostic boot cycles by which host OS 312 and/or service OS 316 may initiate diagnostics that will be carried by a diagnostic boot mode as part of the next boot cycle.

UEFI layer 107 may include UEFI core services 319, UEFI NVRAM 320, and UEFI network stack 321. UEFI core services 319 may include operations for identifying and validating the detected hardware components of an IHS. Portions of NVRAM 320 may be utilized to store core UEFI instructions and to store variables that are used to set UEFI boot and runtime variables that may be used to configure settings of individual hardware components of an IHS 100, such as configurable firmware operations of hardware components. As described in additional detail below, these UEFI variables may be extended for use in requesting a diagnostic boot cycle and in specifying requested diagnostic operations to be performed as part of the next diagnostic boot cycle.

The UEFI network stack 321 may be utilized during initialization of the IHS in support of validation procedures, such as in retrieving reference signatures corresponding to authentic firmware instructions for hardware components of an IHS 100. UEFI core service 319 may also include operations for interfacing with certain hardware of an IHS, in particular user I/O hardware devices 350. As described in additional detail below, UEFI core services 319 may also include instructions for booting IHS 100. In some embodiments, the UEFI core services 319 may also include instructions that implement the described boot sequence operations that support diagnostic boot cycles.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services that interface with sensor hub 207 in implementing various features of an IHS 100, such response to user-presence determination by the sensor hub 207 that is acted upon by the EC 109 in initiation heightened security protocols. As described, EC 109 may interface with some or all of the individual hardware components/systems of an IHS via sideband management channels that are separate from inline communication channels used by the host processor 101 and SoCs.

As indicated in FIG. 3, EC 109 may support one or more diagnostic boot modes 323, in particular diagnostic boot modes by which EC may run diagnostic tests without booting any of host OS 312, SoC 200 or host OS 316. As described above, EC 109 may operate from a separate power plane from the main system resources of an IHS, such as processors 101 and heterogenous computing platform 200. Accordingly, EC 109 may implement diagnostic operations that may run when all other hardware is idle, with no applications other than the diagnostic boot mode of the EC operating on IHS 100. Through such boot modes, EC 109 may provide diagnostic operations that are able to fully test the hardware of an IHS, while providing these capabilities to host OS 312 and/or service OS 316 that are otherwise unable to fully exercise the diagnostic capabilities of the IHS.

As described above, sensor hub 207 may receive inputs from some or all of the sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of an IHS. Such shock detection procedures may detect shocks experienced by an IHS 110 and may characterize and assess detected shocks in evaluating possible damage to the IHS.

FIG. 4 is a diagram illustrating an example of a method, according to some embodiments, for supporting diagnostic boot cycles. Embodiments may thus begin, at 405, with the initialization of an IHS 100 that includes a heterogenous computing platform 200. Upon being powered, at 410, secured boot instructions are accessed in order to initialize a host processor 101 and to locate instructions, in some embodiments stored in UEFI NVRAM 320, for initiating a UEFI boot sequence. The UEFI boot sequence may be described as a series of phases, where successful completion of one phase is generally required for the operation of subsequent phases of the boot sequence.

In some embodiments, the described support for diagnostic boot cycles may be implemented in UEFI boot code that is retrieved from UEFI NVRAM 320 upon initialization of the IHS. The boot instructions of the initial phase of the UEFI boot sequence may be used to validate the authenticity of host processor(s) 101, chipset 102, and the motherboard on which the processor is mounted. In the next phase of the UEFI boot sequence, the execution of UEFI 107 boot code retrieved from UEFI NVRAM 320 enters the PEI (Pre-EFI Initialization) phase. During this phase, initialization of authenticated host processor(s) 101, chipset 102 and the motherboard is completed, along with the initialization of system memory 103.

The UEFI boot sequence also includes the Driver Execution (DXE) phase, where images of bus and core hardware device drivers are retrieved. The core drivers that are loaded are a minimal set required to support boot operations. With core hardware and bus drivers loaded and operating in this manner, the BDS (Boot Device Selection) phase is initiated and is used to identify the boot device that will be used to continue booting. In some embodiments, a diagnostic boot mode may not be initially available in the BDS phase of the boot sequence, since the diagnostic boot mode is not available until a diagnostic boot cycle has been requested, such as by host OS 312 and/or service OS 316. Accordingly, at 415, one of the OSs 312, 316 is selected as the boot device.

The boot sequence continues, at 420, with the retrieval of boot code corresponding to the OS 312, 316 and the use of these instructions to boot an OS. Whether as part of the booting of the OS, or after completely booting of the OS, at 422, embodiments may determine whether diagnostic results are available from a previous diagnostic boot cycle. As above, initially, no diagnostic results will be available since a diagnostic boot cycle has not yet been requested nor completed. Where no diagnostic results are available, host OS 312 and/or service OS 316 may be booted and IHS may operate for any amount of time until one or both of the OSs generates a request for diagnostic operations that are supported by the IHS.

In some embodiments, the diagnostic operations may be requested by a system application 314 of a host OS 312, such as a request for memory diagnostics by the kernel of the OS. In some embodiments, the diagnostic operations may be requested by a user application 313 of a host OS 312, such as a request for network controller diagnostics to be performed in order to isolate identified network errors. At 425, the request by the OS for IHS diagnostic operations is provides to UEFI core services 319 that may implement an API accessible by applications authorized to access UEFI, such as OSs 312, 316.

Upon receipt of a request for diagnostic operations from host OS 312 and/or service OS 316, at 440, the UEFI core services 319 encodes the request within one or more UEFI variables. In some embodiments, a UEFI variable may be designated for signaling a request for operation of a diagnostic boot mode as part of the next boot cycle. In some embodiments, multiple additional UEFI variables may be designated for specifying specify diagnostic tests that are being requested by host OS 312 and/or service OS 316, such as requesting diagnostics of IHS system memory 103, or such as requesting diagnostics supported by a network controller 105, main processor 101, storage drive 113 or other hardware of an IHS.

Once encoded in this manner, the requested diagnostic operations can be performed upon the next boot cycle of the IHS 100. In some instances, the boot cycle may be initiated immediately, such as in scenarios where the diagnostic operations have been requested by the host OS 312 and an administrator operating the IHS has requested the diagnostic operations to be conducted immediately and has confirmed a restart of the IHS. In some instances, the diagnostic boot cycle may be initiated after some delay. For instance, when diagnostic operations are requested by a service OS 316, the service OS may not have ability to terminate other applications operating on an IHS and/or to initiate a restart of the IHS. Accordingly, a request for diagnostic operations by service OS 316 may be addressed upon the next boot cycle of the IHS.

Whether initiated immediately or after some delay, at 445, the boot sequence of the IHS is re-initiated. As described above, the boot sequence of an IHS 100 may include several phases, including selection of a boot device. In embodiments, at 450, this boot device selection phase is reached. In the initial boot cycle of the IHS described above, there was no opportunity for a diagnostic boot cycle to be requested, such that boot device selection reverts to booting of the OS. In subsequent iterations of the boot device selection phase of the boot sequence, at 460, the UEFI diagnostic variables are queried to determine whether a diagnostic boot cycle was requested by the host OS 312 and/or service OS 316.

Based on the queries, at 470, embodiments determine whether a diagnostic boot cycle has been requested. If no diagnostic boot cycle request is identified in the UEFI variables, embodiments continue booting of the OS specified by the default boot device. In scenarios where the UEFI variables indicate a diagnostic boot cycle has been requested, at 475, the diagnostic boot mode of EC 109 may be designated as the boot device. The UEFI boot sequence may thus identify and load instructions for booting EC 109 in the diagnostic boot mode requested in the UEFI variables. In some embodiments, EC 109 may support distinct boot modes for different diagnostic operations, such as a memory diagnostic boot mode and/or a processor diagnostic boot mode. In some embodiments, a single EC 109 boot mode may support all diagnostic operations that may be requested using UEFI variables.

With EC 109 initialized in the requested diagnostic boot mode, at 480, the capabilities of the EC are used to perform the diagnostic operations, where the diagnostic operations that are conducted may be selected based on requests specified by the host OS 312 and/or service OS 316 and subsequently encoded within UEFI variables. As described, EC 109 may support sideband signaling pathways by which EC may provide remote management of IHS 100 and of individual hardware components of IHS 100. EC 109 may also operate while other hardware of the IHS operates in a low-power or standby mode, thus allowing the EC to conduct diagnostic tests supported by the hardware, all while having exclusive use of this hardware and thus able to fully test the capabilities of the hardware.

The requested diagnostic operations may generate a variety of results that may be encoded within data structures as part of the diagnostic boot mode. In some embodiments, at 485, these data structures encoding the diagnostic results may be stored to a dedicated partition of UEFI NVRAM 320. In some embodiments, the diagnostic results may be stored to the UEFI NVRAM 320 by EC 109 directly as part of the diagnostic boot mode, with the diagnostic boot mode exiting upon writing the diagnostic results to the UEFI NVRAM. Upon exiting the diagnostic boot mode, at 490, embodiments may map the diagnostic results stored in the UEFI NVRAM 320 to entries in the ACPI table that is utilized by the IHS, and in particular an ACPI table used by host OS 312 and/or service OS 316.

With the diagnostic results mapped to ACPI table entries, at 495, embodiments may reset the UEFI variables used to request the diagnostic boot cycle. In particular, the UEFI variables specified by the host OS 312 and/or service OS 316 in requesting the current diagnostic boot mode are reset such that the boot device selection operations in the next boot sequence do not initiate another diagnostic boot mode. Once reset in the manner, the UEFI variables do not trigger diagnostic boot mode again until another diagnostic boot cycle is requested by host OS 312 and/or service OS 316.

Once the UEFI variables used to request a diagnostic boot cycle have been reset, at 405, the IHS is again reinitialized. As describe above, the IHS boot sequence may include several phases. Boot code is retrieved and the boot device is selected. With the resetting of the UEFI diagnostic boot cycle variables, the boot device selection phase of the boot sequence selects the OS boot device and the OS is booted. Once the OS has been booted, at 422, the OS determines whether diagnostic results are available. In some embodiments, the OS queries the ACPI table entries designated for diagnostic results. As described, this ACPI table may be populated as part of the diagnostic boot mode.

In scenarios where these ACPI table entries have been populated, at 424, the OS reads the diagnostic results from these table entries. In this manner, a host OS 312 and/or service OS 316 may request diagnostic operations supported by an IHS 100, with these operations conducted without the OS running and without any processes operating other than the requested diagnostic operations, thus ensuring all hardware resources are fully available for these diagnostic operations.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below.

Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), that comprises:

an Embedded Controller (EC);

a Non-Volatile Random-Access Memory (NVRAM); and one or more processors coupled to the NVRAM, wherein the NVRAM comprises boot instructions that, upon execution by the one or more processors, cause the IHS to perform operations that comprise:

initiate a boot sequence, wherein the boot sequence comprises a Unified Extensible Firmware Interface (UEFI) boot sequence;

detect a request from a requestor for a diagnostic boot cycle, wherein the requestor comprises an operating system (OS) application configured to execute on the IHS, and wherein the request is encoded within one or more UEFI variables by UEFI core services in response to a request for diagnostic operations from the OS application;

in response to detection of the request for the diagnostic boot cycle, in a boot device selection phase of the UEFI boot sequence, query the one or more UEFI variables and designate a diagnostic boot mode of the EC as a boot device, and boot the EC in the diagnostic boot mode to perform one or more diagnostic tests on one or more hardware components of the IHS, wherein the one or more diagnostic tests are selected based on one or more additional UEFI variables that specify requested diagnostic tests and wherein the EC performs the one or more diagnostic tests while the OS application is not active and while other hardware of the IHS is configured to operate in a low-power or standby mode such that the EC has exclusive use of the one or more hardware components under test;

store results of the one or more diagnostic tests to a dedicated partition of the NVRAM, wherein the dedicated partition comprises a dedicated partition of UEFI NVRAM and wherein the diagnostic boot mode exits upon write of the results to the NVRAM; and boot the IHS, wherein the requestor has access to the diagnostic test results stored in the dedicated partition of the NVRAM.

2. The IHS of claim 1, wherein the diagnostic boot cycle is requested via one or more UEFI variables.

3. The IHS of claim 2, wherein the diagnostic boot cycle request comprises a request for a diagnostic test supported by the IHS.

4. The IHS of claim 3, wherein the request for the diagnostic test is specified in one or more additional UEFI variables in addition to the one or more UEFI variables that signal the request for the diagnostic boot cycle.

5. The IHS of claim 3, wherein the diagnostic test comprises a diagnostic test of system memory of the IHS.

6. The IHS of claim 1, wherein the diagnostic boot cycle request comprises a request for a first boot mode of the EC.

7. The IHS of claim 6, wherein the first boot mode of the EC supports one or more diagnostic tests on a first hardware component of the IHS.

8. The IHS of claim 1, wherein the requestor further comprises at least one of: an OS kernel, or a user application configured to execute on the IHS.

9. The IHS of claim 8, wherein the OS application comprises an OS application configured to execute on an SoC (System-on-Chip) of the IHS.

10. The IHS of claim 1, wherein the boot instructions executed by the one or more processors further cause the IHS to map the stored results of the diagnostic test to Advanced Configuration and Power Interface (ACPI) entries designated for diagnostic results.

11. The IHS of claim 10, wherein the requestor is configured to access the diagnostic test results by a query to the ACPI entries designated for diagnostic results.

12. A method for booting an Information Handling System (IHS), the method comprising:

initiating a boot sequence, wherein the boot sequence comprises a Unified Extensible Firmware Interface (UEFI) boot sequence;

detecting a request from a requestor for a diagnostic boot cycle, wherein the requestor comprises an operating system (OS) application configured to execute on the IHS and wherein the request is encoded within one or more UEFI variables by UEFI core services in response to a request for diagnostic operations from the OS application;

in response to detecting the request for the diagnostic boot cycle, in a boot device selection phase of the UEFI boot sequence, querying the one or more UEFI variables and designating a diagnostic boot mode of an Embedded Controller (EC) as a boot device, and booting the EC in the diagnostic boot mode to perform one or more diagnostic tests on one or more hardware components of the IHS, wherein the one or more diagnostic tests are selected based on one or more additional UEFI variables that specify requested diagnostic tests and wherein the EC performs the one or more diagnostic tests while the OS application is not running and while other hardware of the IHS operates in a low-power or standby mode such that the EC has exclusive use of the one or more hardware components under test;

storing results of the one or more diagnostic tests to a dedicated partition of a Non-Volatile Random-Access Memory (NVRAM) of the IHS, wherein the dedicated partition comprises a dedicated partition of UEFI NVRAM, wherein the results are stored by the EC, and wherein the diagnostic boot mode exits upon writing the results to the NVRAM;

mapping the stored results to Advanced Configuration and Power Interface (ACPI) entries;

preventing, based, at least in part, upon resetting diagnostic boot cycle request variables, wherein the diagnostic boot cycle request variables comprise the one or more UEFI variables used to request the diagnostic boot cycle, diagnostic boot cycle triggering until a subsequent request is detected; and booting the IHS, wherein the requestor has access to the diagnostic test results stored in the dedicated partition of the NVRAM by a query to the ACPI entries.

13. The method of claim 12, wherein the diagnostic boot cycle is requested via one or more UEFI variables encoded by UEFI core services in response to a request for diagnostic operations from the requestor.

14. The method of claim 12, wherein the diagnostic boot cycle request comprises a request for a first boot mode of the EC.

15. The method of claim 12, wherein the requestor further comprises at least one of: an OS kernel, or a user application running on the IHS.

16. A Non-Volatile Random-Access Memory (NVRAM) storage device that comprises instructions stored thereon, wherein execution of the instructions by one or more processors of an Information Handling System (IHS) causes the one or more processors to perform operations that comprise:

initiate a boot sequence, wherein the boot sequence comprises a Unified Extensible Firmware Interface (UEFI) boot sequence;

detect a request from a requestor for a diagnostic boot cycle, wherein the requestor comprises an operating system (OS) application configured to execute on the IHS and wherein the request is encoded within one or more UEFI variables by UEFI core services in response to a request for diagnostic operations from the OS application;

in response to detection of the request for the diagnostic boot cycle, in a boot device selection phase of the UEFI boot sequence, query the one or more UEFI variables and designate a diagnostic boot mode of an Embedded Controller (EC) as a boot device, and boot the EC in the diagnostic boot mode to perform one or more diagnostic tests on one or more hardware components of the IHS, wherein the one or more diagnostic tests are selected based on one or more additional UEFI variables that specify requested diagnostic tests and wherein the EC performs the one or more diagnostic tests while the OS application is not active and while other hardware of the IHS operates in a low-power or standby mode such that the EC has exclusive use of the one or more hardware components under test;

store results of the one or more diagnostic tests to a dedicated partition of the NVRAM, wherein the dedicated partition comprises a dedicated partition of UEFI NVRAM, wherein the results are stored by the EC, and wherein the diagnostic boot mode exits upon write of the results to the NVRAM;

map the stored results to Advanced Configuration and Power Interface (ACPI) entries;

prevent, based, at least in part, upon reset of diagnostic boot cycle request variables, wherein the diagnostic boot cycle request variables comprise the one or more UEFI variables used to request the diagnostic boot cycle, re-entry to a diagnostic boot cycle unless a subsequent request is detected; and boot the IHS, wherein the requestor has access to the diagnostic test results stored in the dedicated partition of the NVRAM by a query to the ACPI entries.

17. The NVRAM storage device of claim 16, wherein the requestor further comprises an operating system (OS) kernel configured to execute on the IHS.

* * * * *